Feb. 26, 1963    T. C. CAMPBELL ET AL    3,079,112
AIRCRAFT COCKPITS
Filed March 17, 1961
3 Sheets-Sheet 1

Inventors:
Thomas Cochrane Campbell
Geoffrey Francis Sharples
By: Stevens, Davis, Miller & Mosher
Attorneys Feb. 26, 1963 T. C. CAMPBELL ET AL 3,079,112
AIRCRAFT COCKPITS
Filed March 17, 1961 3 Sheets-Sheet 3

Inventors:
Thomas Cochrane Campbell
Geoffrey Francis Sharples
By: Stevens, Davis, Miller & Mosher
Attorneys

3,079,112
AIRCRAFT COCKPITS
Thomas Cochrane Campbell, St. Anne's-on-the-Sea, and Geoffrey Francis Sharples, Broughton, near Preston, England, assignors to The English Electric Company Limited, London, England, a British company
Filed Mar. 17, 1961, Ser. No. 96,415
Claims priority, application Great Britain Jan. 11, 1956
4 Claims. (Cl. 244—122)

This patent application is a continuation in part of the patent application Serial No. 631,001 filed December 27, 1956, by Thomas Cochrane Campbell and Geoffrey Francis Sharples; assignors to The English Electric Company Limited.

The invention relates to the cockpit of an aircraft designed mainly for cruising at extreme altitudes and Mach numbers.

In aircraft of this kind visual control by the pilot is required, and indeed possible, only for the take-off, refuelling in flight, landing and taxying, while in all other conditions of flight instrument control is both sufficient and necessary, the piloting activity of the pilot being then limited to occasional adjustments or emergency operations.

On the other hand the navigator and operator of automatic photographic and radar equipment requires assistance which would necessitate a third member of the crew. As, however, the space available in aircraft designed for operation in the extreme conditions mentioned is very limited, a crew of three would be confined to rather cramped conditions. Further, the pilot would be almost completely unoccupied during the cruise phase and therefore liable to suffer fatigue from boredom. The present invention solves this problem by enabling the pilot to perform the duties of a second navigator and of an operator of the photographic and radar equipment during the greater part of the flight when his service for piloting the aircraft is not required.

According to the invention the cockpit contained in the front fuselage of an aircraft is arranged so that in the pilot's compartment the pilot may take up two alternative controlling positions, a high one from which he has the usual vision required for take off, refuelling in flight, landing and taxying, through a windshield to the space forward and laterial of the aircraft, and a low one at which in lieu of such vision he has access to and can operate radar, photographic and navigational instruments and displays. Transport of the pilot from one position to the other is achieved by providing a pilot's seat assembly, which is moveable between the two positions and preferably conventional power means are provided to achieve such movement. It should be noted that the exterior aerodynamic shape of the fuselage is the same for either pilot position.

So that the pilot may be able to control the aircraft from either position the main aircraft flight instruments and flight controls are arranged to be available to him in either the high or low positions, with the exception of the rudder control also used for ground wheel steering, and wheel brakes, which are only used in the upper position. Preferably this is achieved by duplicating the stick controlling the ailerons, tailplane or elevators, providing onestick control in each position mounted from the side of the fuselage so as not to interfere with the pilot's seat assembly movement; by mounting most of the flight instruments on a single panel, which may be tilted preferably by automatic power means so as to be clearly viewable from either pilot position; and by mounting the remaining main flight controls on two consoles, one at either side and part of the pilot seat assembly. These remaining controls will include autopilot controls, the autopilot usually being the controlling medium for the cruise phases of flight.

If a second crew member is carried, he is preferably placed in a second compartment which is forward of the pilot's compartment and with communication between the two compartments.

In one embodiment the pilot's seat assembly comprises a back plate sliding in substantially vertical rails attached to the rear structure of the pilot's compartment and moved by a suitable hydraulic jack and connecting arm. On this plate is mounted a pilot's ejection seat of conventional type, containing its own ejection rails and system including the ejection gun. Also on this plate are mounted the said two consoles containing the remaining main flight controls. Transmission from these consoles to the controlled or controlling mechanisms will be mainly of an electrical or hydraulic nature and is therefore achieved by means of flexible electrical or hydraulic connectors, or mechanically by a moveable connector such as a Bowden wire, so as not to impede the movement of the seat assembly.

In a preferred arrangement a type of ejection seat is used in which lengthened seat ejection rails are mounted directly on the rear structure of the pilot's compartment and the seat ejection gun, which fires the seat up these rails on ejection, and one end of which is normally attached via a back plate to the rear structure in a single fixed position, is instead attached to said rear structure through the medium of a connecting rod and jack arrangement, so that by operating said jack the position of the gun relative to said rear structure is altered, and so is also the position of the seat. The two side consoles are directly mounted on the back plate of the gun or else are mounted on to the seat itself, the flexible connection from the consoles to the aircraft services or control mechanisms being provide with a quick disconnect in the form of pull-out electrical connections or hydraulic pipe junctions held together by explosive bolts, or other suitable known means of achieving quick disconnection. A hydraulic jack and connecting rod mechanism of a known type is provided between the fuselage and the ejection seat gun back plate to serve as a power means of raising or lowering the pilot's seat assembly between its two alternative positions, and as a means of locking it in either position.

The connections to the said tiltable instrument panel, being again of an electrical, hydraulic or gaseous nature, are made flexible and a suitable electrical motor or hydraulic jack system is provided to tilt the panel so that it takes up the correct alternative position in relation to the position of the pilot's seat assembly.

In order that the invention may be clearly understood and readily carried into effect, an embodiment thereof will now be described by way of example with reference to the accompanying drawings, in which:

FIG. 1 is a diagrammatic side elevation of the crew's cockpit with the pilot at visual flight station.

FIG. 2 corresponds to FIG. 1 but with the crew at operational stations respectively, FIG. 3 is a diagrrammatic plan view with the pilot's seat at visual flight station, FIG. 4 is a cross section giving the navigator's presentation.

Figure 1:
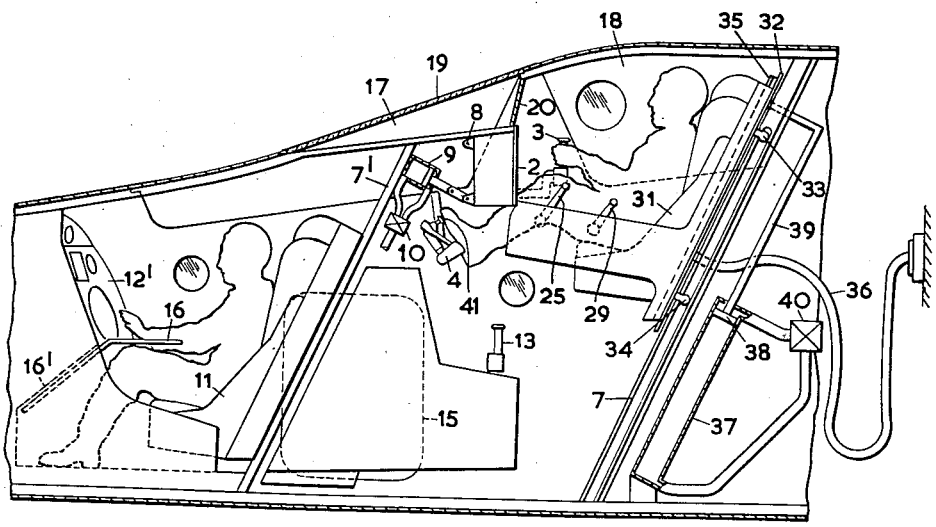

In the visual flight station the pilot's seat assembly 1 is slid up to its high level position, in which the pilot has the usual forward and lateral field of vision. In front of the pilot there is arranged a tiltable instrument panel 2 carrying the flying and engine instruments as required for the particular role of the aircraft and type of power plant fitted. A duplicated control stick 3 and 13 for roll and pitch control, and pedals 4 for the rudder control and for steering on the ground with toe wheel brake controls 41 are also provided. On each side of the pilot consoles 5, 6 are arranged integral with the seat assembly, which consoles carry the remaining flight controls and any main flight instruments not contained in panel 2, for instance fuel contents gauges. Examples of the main flight controls carried on consoles 5 and 6 are the engine controls 25, the controls 29 for auxiliary engines, autopilot controls, radio communication controls, and pilot's seat assembly controls.

Figure 5:
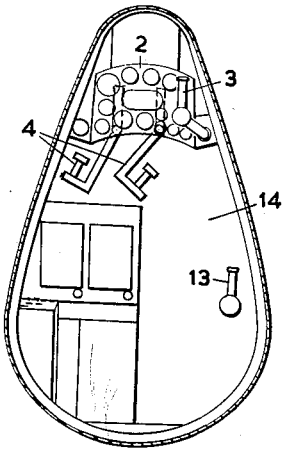
FIG. 5 is a cross section giving the pilot's presentation.

In operation, e.g. during the cruise, the pilot's seat 1 is lowered to the level of the navigator's seat 11. It will be seen from FIG. 2, which is a lateral elevation of the cockpit with the crew at reconnaissance stations, that the said instrument panel 2 containing the instruments as stated hereinabove is tilted about a horizontal axis transverse of the cockpit, so that these instruments are visible to the pilot without difficulty also from his operational station. While the said instrument panel 2 is accordingly visible to the pilot in this lowered position, and the instrument and controls on the consoles 5, 6 move with the pilot into his lowered position, the control stick 3 is duplicated in the said position by a stick 13. On the other hand, the pedals 4 and toe brake controls 41 attached thereto and served by flexible hydraulic pipes (not shown) are not then required, and the inclusion of an ordinary friction hinge in the stem of said pedals enables them with the toe brake controls to be swung over to the port side, out of the way as indicated in FIG. 5 so as to increase the head room available in the gangway 14 on the starboard side of the crew's cockpit left clear by the positioning of the navigator's seat 11 offset from the centre to port. This gangway 14 permits access to both stations from a single entrance door 15 on the starboard side of the crew's cockpit, and allows physical contact between the pilot and the navigator.

The displays of instruments for the navigator are arranged in front of his seat in the form of consoles 12, 12' in such a manner as to obviate, or at least reduce, errors owing to parallax in assessing the displays. The arrangement of these displays is such that those on the console 12' to which the pilot may wish to refer during the operational phase of the flight are positioned on the gangway side of the navigator's console 12 and are therefore well visible from the pilot's seat 1 in its lowered position. The actual composition and arrangement of the navigator's display depends on the role allotted to the aircraft.

Figure 3:
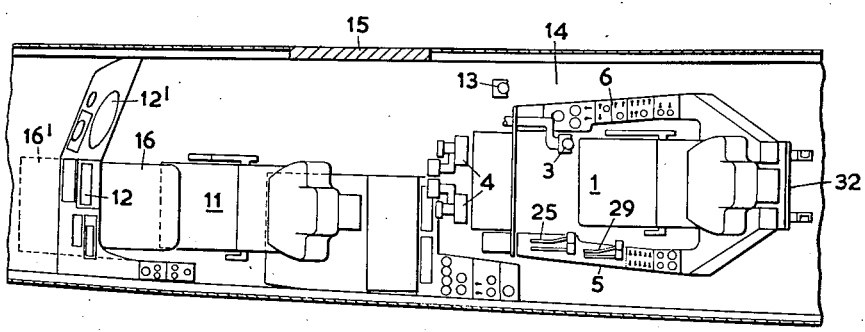

A navigation table 16 in front of the navigator's seat 11 may be slid in guides 16' into a leg recess as indicated in dotted lines in FIGS. 1 and 3.

Figure 2:
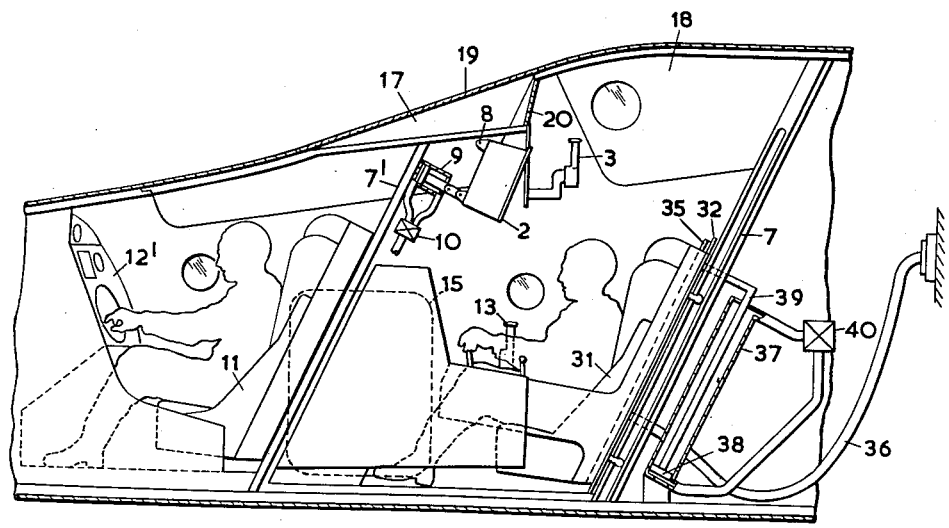
Figure 4:
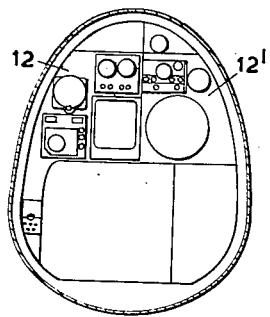

Referring to FIGS. 1 and 2, a back plate 32 slides on rails 7 by means of runners 33. This plate 34 carries further rails 35, upon which are mounted the ejection seat 31 of conventional design and it carries also the ejector gun (not shown) for the seat. For ejection purposes therefore the ejector seat is self-contained on the back plate 32. The back plate also carries independently the control and instrument consoles 5 and 6 as shown in plan view in FIG. 3, and a flexible connection 36 is brought out from these thorugh the back plate and connected to the appropriate aircraft services and controls. The hydraulic jack 37 has a piston 38 attached by means of a suitable connecting rod 39 to the back of the back plate 32. Hydraulic power is admitted to the jack 37 on either side of the piston 38 by known means of a solenoid operated valve shown diagrammatically at 40 and controlled from the consoles 5 or 6 so that the jack 37 may move the back plate and seat up and down or lock the back plate in any chosen position.

Figure 6:
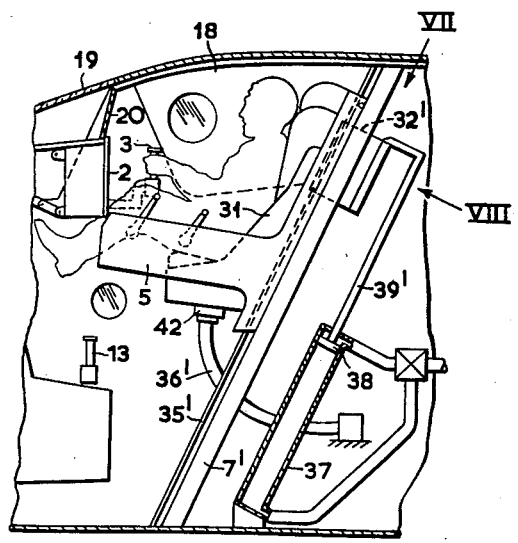
FIG. 6 is a side elevation of an alternative pilot's seat assembly using the ejector seat rails.
Figures 7, 8:
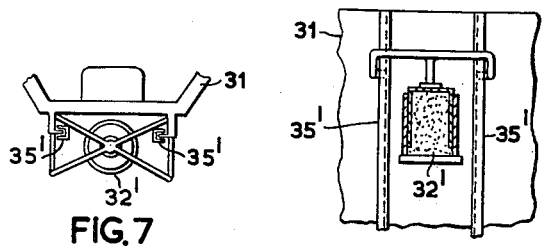
FIG. 7 is a part view in the direction of the arrow VII of FIG. 6.
FIG. 8 is a part view in the direction of the arrow VIII of FIG. 6.

Referring to the alternative seat assembly illustrated in FIGS. 6, 7 and 8, the ejector seat rails 35' of the ejector seat 31 are extended in their run and mounted in the usual way on the structure 7' to run for its whole vertical length. Typical ejector seats of this type have an ejection gun, shown dotted as 32', which is capable of moving up and down between the structural members 7'. The gun comprises a cylinder and piston with explosive between them, the piston being attached to the seat and the cylinder locked to the structure of the aircraft. In this embodiment the cylinder is rigidly connected to the connector 39' from the jack and piston arrangement 37, 38 so that it can be moved vertically up and down or locked in the same manner as that described in relation to FIG. 1, whereby moving the pilot's ejection seat up and down between the high and the low positions. The consoles 5 and 6 are an integral part of the ejection seat and the connections to them are taken to a quick disconnect joint 42 situated below or behind the seat which connects to the flexible connection 36' leading to the aircraft services and control mechanisms. This disconnect joint breaks on the ejection of the seat. Apart from the extended rails the moveable gun cylinder, the quick disconnect joint and the additional control consoles, the ejection seat and canopy jettison gear is of standard design as already known in a number of forms.

Referring again to FIGS. 1 and 2, the tiltable instrument panel 2 is mounted to the aircraft structure by means of a hinge or pivot 8. Again mounted to the aircraft structure forward of the panel is a usual jack, piston and valve arrangement 9 and 10 similar to the arrangement 37, 38 and 40. In this case, however, the piston is connected to the lower forward edge of the instrument panel by means of a connecting rod and a pivot. Oil pressure applied to the jack moves the piston and moves the instrument panel so as to tilt it in the required direction. The functioning of the jack 9 can be arranged to operate from the oil supplies on the jack side of valve 40 instead of using a separate valve 10. In this way the panel can be made to tilt valve and jack arrangement 37, 40 so that the panel tilts automatically as the pilot moves his seat up or down.

If it becomes necessary to abandon aircraft, the normal procedure will be for the pilot to raise himself to the visual flight stations (FIG. 1). He will then remain in control of the aircraft until the same has been abandoned by the navigator.

To give the pilot some protection from blast, the structure above the navigator and pilot is divided into two hatches 17, 18 for ejection purposes. That above the navigator 17, carries a sloping windshield 19. In order to protect the pilot's head from direct blast, an additional flat glass panel 20 extends across the pilot's hatch 18 and is fixed thereto. This panel 20 together with flying instrument panel 2 affords a considerable amount of protection from the air stream to the pilot prior to his ejection.

What we claim as our invention and desire to secure by Letters Patent is:

1. In an aircraft, a cockpit comprising in combination: a pilot's seat assembly, adjustable to an upper position affording outward vision for the visual control of the aircraft during take-off, refuelling in flight, landing and taxying, and a lower position for the performance by the pilot of ancillary operational duties, navigation and instrument flying, operating means capable of moving the said mounting means from one of the said positions to the other and locking them in either position, a main flight instrument panel viewable by the pilot from either position of said seat assembly, main flight controls accessible to the pilot from either position of the said seat assembly, and control pedals accessible to the pilot only in the upper position of the said seat assembly.

2. A cockpit as claimed in claim 1 wherein said main instrument panel is arranged wholly within said cabin tiltable about an axis from a position visible to the pilot in said raised position of the pilot's seat assembly to a position visible to the pilot from said lowered position thereof.

3. A cockpit as claimed in claim 1, in which said pilot's seat assembly comprises a back plate, movable into different level positions, an ejector seat and side, consoles carried by said back plate, said consoles being arranged laterally of said seat and permanently containing the said main flight instruments and controls, and flexible connectors connecting said consoles to said cockpit.

4. A cockpit as claimed in claim 1, comprising a fixed navigator's ejection seat laterally offset from said pilot's seat and comprising a gangway by the side of the said navigator's seat leading back to the pilot's seat in the lower position of the latter, and wherein said control pedals are mounted movable transversely of the said cockpit from an operative position corresponding to and accessible from the pilot's seat in the raised position thereof to a stowed position corresponding to the lowered position of the pilot's seat and laterally of the said gangway, clearing the headroom above the latter.

References Cited in the file of this patent

UNITED STATES PATENTS

| | | |
|---|---|---|
| 2,142,997 | Case | Jan. 10, 1939 |
| 2,709,556 | Jandris | May 31, 1955 |

FOREIGN PATENTS

| | | |
|---|---|---|
| 716,116 | Germany | Jan. 13, 1942 |